US006411369B1

(12) United States Patent
Suzuki et al.

(10) Patent No.: US 6,411,369 B1

(45) Date of Patent: Jun. 25, 2002

(54) IMAGE-FORMING SYSTEM AND RECORDING SHEET FOR SAME

(75) Inventors: Minoru Suzuki, Tochigi; Hiroshi Orita, Saitama; Hiroyuki Saito, Saitama; Katsuyoshi Suzuki; Koichi Furusawa, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,857

(22) Filed: Mar. 12, 1999

(30) Foreign Application Priority Data

Mar. 12, 1998 (JP) .......................................... 10-080429
Mar. 17, 1998 (JP) .......................................... 10-088025

(51) Int. Cl.[7] .......................... G03B 27/00; B41J 2/315; G03C 1/72; B32B 3/26

(52) U.S. Cl. .................. 355/400; 400/120.02; 430/138; 428/321.5

(58) Field of Search ................................ 355/400–408; 400/241.2, 120.02; 430/138; 503/215; 428/321.5

(56) References Cited

U.S. PATENT DOCUMENTS

| | | | | | |
|---|---|---|---|---|---|
| 4,399,209 | A | | 8/1983 | Sanders et al. | 430/138 |
| 4,440,846 | A | | 4/1984 | Sanders et al. | 430/138 |
| 4,644,376 | A | | 2/1987 | Usami et al. | 503/215 |
| 5,104,767 | A | | 4/1992 | Nakamura | 430/138 |
| 5,213,940 | A | * | 5/1993 | Inaishi et al. | 430/138 |
| 5,573,885 | A | * | 11/1996 | Inui et al. | 430/138 |
| 5,825,985 | A | | 10/1998 | Asai et al. | 358/1.8 |
| 6,037,093 | A | * | 3/2000 | Hattori | 430/138 |
| 6,106,173 | A | * | 8/2000 | Suzuki et al. | 400/120.02 |
| 6,109,800 | A | * | 8/2000 | Suzuki et al. | 400/120.02 |
| 6,139,914 | A | * | 10/2000 | Suzuki et al. | 427/213.3 |
| 6,161,971 | A | * | 12/2000 | Suzuki et al. | 400/120.01 |

FOREIGN PATENT DOCUMENTS

| | | |
|---|---|---|
| JP | 61137787 | 6/1986 |
| JP | 4-4960 | 1/1992 |

* cited by examiner

*Primary Examiner*—Russell Adams
*Assistant Examiner*—Rodney Fuller
(74) *Attorney, Agent, or Firm*—Greenblum & Bernstein, P.L.C.

(57) ABSTRACT

A recording sheet includes a micro-capsule layer which includes a plurality types of micro-capsules colored with different colors, for example, primary or complimentary colors of a subtractive mixture. The micro-capsules are filled with core materials which are discharged when the micro-capsules are broken. Each type of micro-capsule is selectively broken by a selective temperature and pressure application. When a micro-capsule is broken, the core material blends out the color of the micro-capsule. Additionally, an image forming system includes a heating unit for selectively heating the micro-capsules by an output of a Joule heat or light irradiation. Different wavelengths of light are radiated by the light irradiation heating unit, which are absorbed depending upon an absorption band exhibited by the different colored micro-capsules.

18 Claims, 15 Drawing Sheets

IMAGE-FORMING SYSTEM AND RECORDING SHEET FOR SAME

BACKGROUND OF THE INVENTION

1. Field of the Invention

The present invention relates to a color image-forming system for forming an image on a recording sheet, coated with a micro-capsule layer by selectively breaking and squashing the micro-capsules in the micro-capsule layer. Further, the present invention relates to such a recording sheet used in the image-forming system.

2. Description of the Related Art

In a conventional color-image forming system, a color image is formed on a recording sheet by a color printer of a color copier. The color image is formed by a plurality of kinds of color ink and color toner or other color developments on a recording sheet. Advantageously, it is possible to form the color image on any type of recording media, however, disadvantageously, a plurality of recording processes are necessary as each color is separately recorded on the recording sheet through independent recording processes. Thus the color-image forming process is complicated and the process time is rather long.

Another system is known, in which a color image is formed by focusing an optical color image on a color photographic paper. Chemical processes, such as a development process and a fixing process, using expensive equipment are necessary for the system. The photographic paper must also be carefully handled due to its photosensitivity. Therefore, this system needs a large amount of equipment investment and highly professional operators.

In Japanese Patent Publication after Examination Hei04-004960, a color image recording media is shown, that consists of a base sheet with a layer of the micro-capsules covering the base sheet. The micro-capsules are filled with heat-sensitive and photosensitive color developing dye or ink. The color of the dye or ink changes in response to a temperature change and the color is fixed by light irradiation of a predetermined wavelength at a predetermined temperature. When three temperature levels are determined corresponding to three different colors, and the light to be radiated is determined for fixing the colors at the determined temperature levels, a color image can be formed on the micro-capsule layer. This system needs a long process time due to a plurality of recording processes required for one color image, similarly to the above color printer or the color copier.

SUMMARY OF THE INVENTION

Therefore, an object of the present invention is to provide a color image-forming system for forming an image on a recording sheet, coated with a micro-capsule layer, by selectively breaking and squashing the micro-capsules in the micro-capsule layer.

Another object of the present invention is to provide a pressure-sensitive and heat-sensitive recording sheet for simple and efficient recording of a full-color image.

An image-forming system according to the present invention comprise a recording sheet that includes a base member and a micro-capsule layer of a plurality of types of micro-capsules on the base member, each type of micro-capsules being broken under a predetermined pressure and temperature, each type of micro-capsules having a color different from other types of micro-capsules, each type of micro-capsules being filled with a core material which is discharged when each type of micro-capsules is broken, color being blended-out when core material is discharged, and a selective breaking unit for selectively breaking said micro-capsules.

A recording sheet of an image-forming system according to the present invention comprises a base member, and a micro-capsule layer of a plurality of types of micro-capsules on the base member, each type of micro-capsule being broken under a predetermined pressure and temperature, the predetermined pressure and temperature of one type of micro-capsule being different from said predetermined pressure and temperature of other types of micro-capsule, each type of micro-capsule having a color different from other types of micro-capsule, each type of micro-capsule being filled with a core material which is discharged when the micro-capsule is broken, such that the color is blended-out.

Another recording sheet according to the present invention comprise a base member, and a micro-capsule layer of a plurality of types of micro-capsules on the base member, the total micro-capsules being broken under a predetermined pressure and temperature, each type of micro-capsule having a color different from other types of micro-capsule, each type of micro-capsule being filled with a core material which is discharged when the micro-capsule is broken, such that the color is blended-out.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
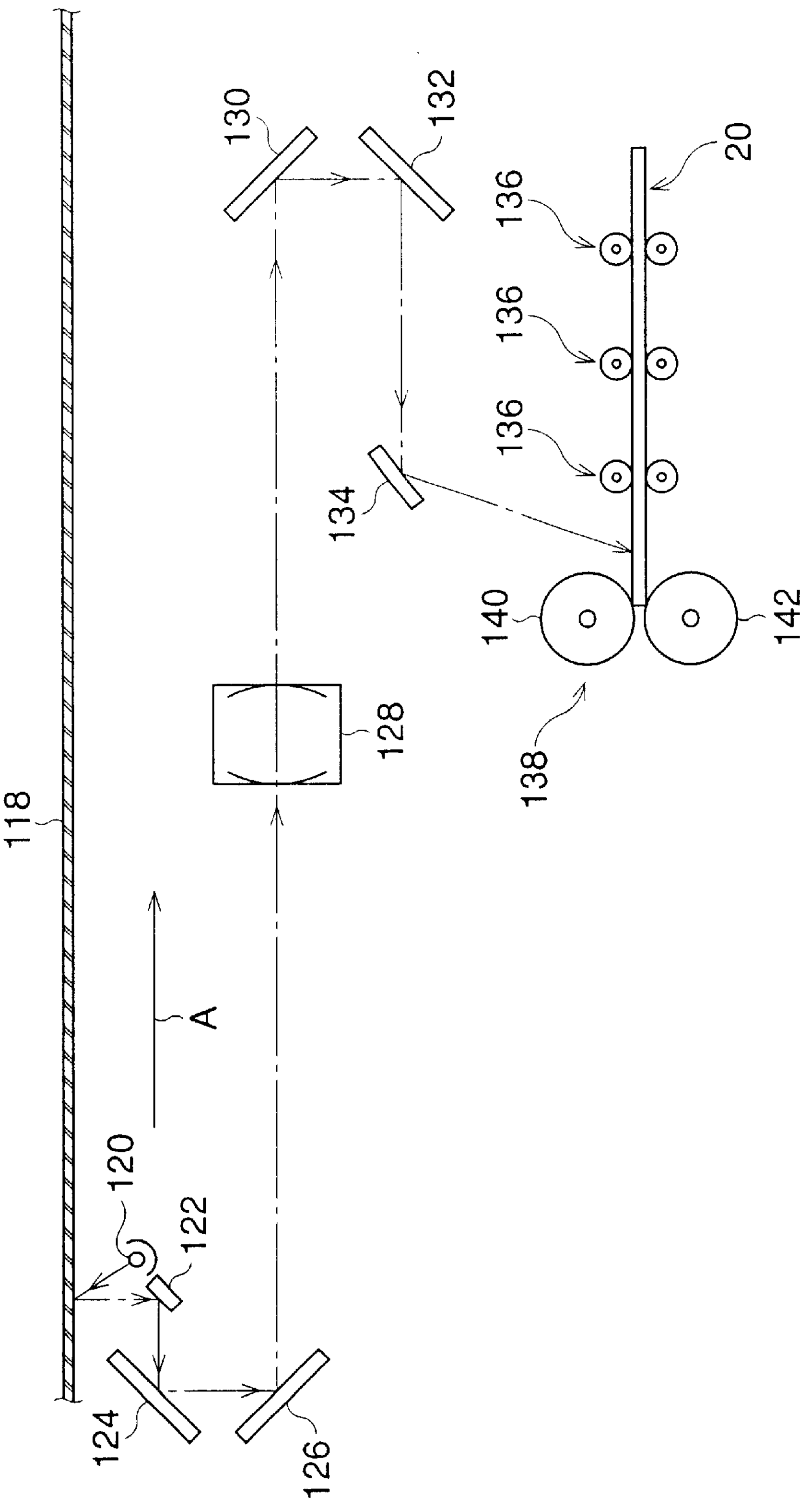
FIG. 1 is a schematic cross-sectioned elevational view of a first embodiment of an image forming system according to the present invention.

FIG. 1 is a schematic cross-sectioned elevational view of a first embodiment of an image forming system. The image forming system includes a flat bed 118 made of a transparent glass plate for supporting a manuscript (not shown) on an upper surface. A white light beam is radiated from a lamp 120, such as a halogen lamp, and passes through the bed 118 to the manuscript. Light is reflected by the manuscript to reflecting mirrors 122, 124 and 126, successively, so that the light is directed to a condenser lens 128. The condenser lens 128 focuses the light through reflecting mirrors 130, 132 and 134 on to the recording sheet 20. Thus, the color image on the manuscript is formed on the recording sheet 20. A focusing unit is constructed by the lens 128, mirrors 122, 124, 126, 130, 132 and 134.

The mirror 122 is a scanning mirror which runs along the bed 118, shown by an arrow "A", together with the lamp 120, so that a predetermined area of the manuscript is scanned. The reflecting mirrors 124 and 126 run in the direction "A" following the scanning mirror 122 and the lamp 120. The running speed of the mirrors 124 and 126 is half the running speed of the mirror 122 and the lamp 120. Thus, when the lens 128 is fixed, a length of an optical axis from the lamp 120 to the lens 128 remains constant. The mirrors 122, 124 and 126 are horizontally perpendicular to the direction "A" and cover a width of the manuscript to be scanned. The lens 128 is movable together with the mirrors 130 and 132 so as to change a length of the optical axis from the lamp 120 to the lens 128, while the mirror 134 is fixed for projecting the optical image at a predetermined fixed position. A magnification of the image formed on the recording sheet 20 is adjusted by changing the length of the optical axis. FIG. 1 shows a magnification adjustment of "1".

In this embodiment, a first embodiment of a recording sheet 20 shown in FIGS. 2 to 7 is used, in which micro-capsules 24, 25 and 26 have walls 24*a*, 25*a* and 26*a* of the same thickness and exhibit the same characteristics of breaking pressure and temperature. The walls are selectively broken only by a selective heating due to varying absorptivity of light. A selective breaking unit in this embodiment is a heating unit for selectively heating the micro-capsules, which have varying absorption bands, by radiated light that is selectively absorbed by the micro-capsules.

Figure 2:
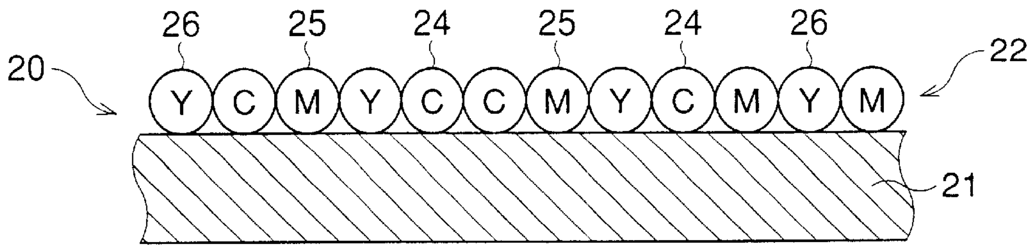
FIG. 2 is a cross-sectioned elevational view showing a structure of a recording sheet of a first embodiment.

FIG. 2 is a cross-sectioned elevational view showing a structure of the recording sheet 20 of the first embodiment.

Figure 3:
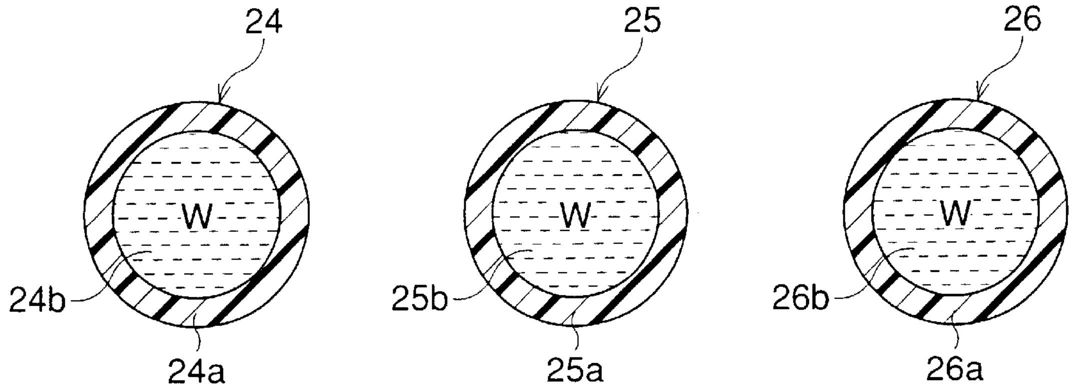
FIG. 3 is a cross-sectioned elevational view showing first to third types of micro-capsules utilized in the first embodiment.

The recording sheet 20 includes a base member 21 made of white paper, which is coated with a micro-capsule layer 22 formed from a suitable binder (adhesive). The micro-capsule layer 22 includes the three types of micro-capsules 24, 25 and 26, being a cyan type of micro-capsule 24, a magenta type of micro-capsule 25 and a yellow type of micro-capsule 26, respectively. As shown in FIG. 3, the micro-capsules 24, 25 and 26 have capsule walls 24*a*, 25*a* and 26*a*, respectively, filled with core materials 24*b*, 25*b* and 26*b*, respectively. The walls 24*a*, 25*a* and 26*a* are colored cyan, magenta and yellow. The core materials 24*b*, 25*b* and 26*b* are made of white ink for blending-out, i e. hiding, the color of the walls 24*a*, 25*a* and 26*a*.

Figure 4:
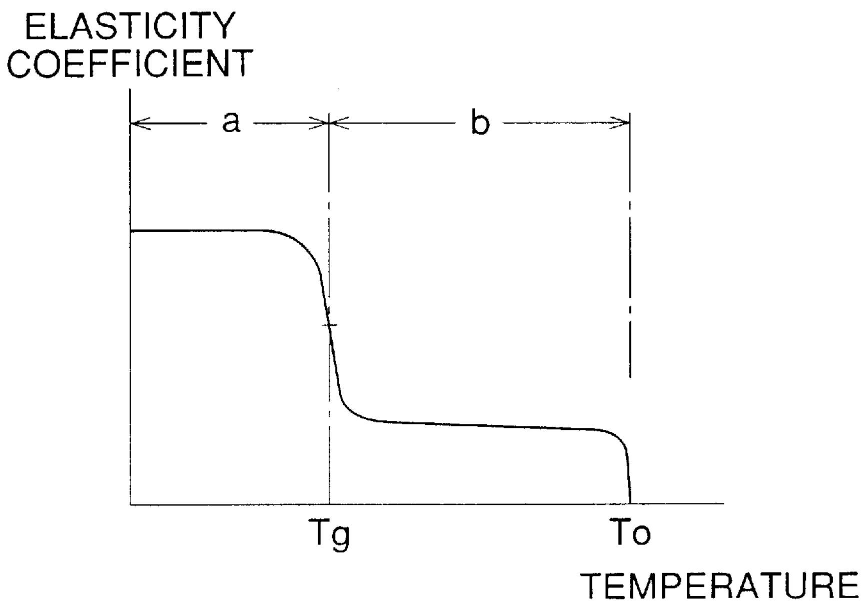
FIG. 4 is a graph diagram showing a characteristic relationship between temperature and elasticity coefficient of a shape memory resin of the micro-capsules.
Figure 5:
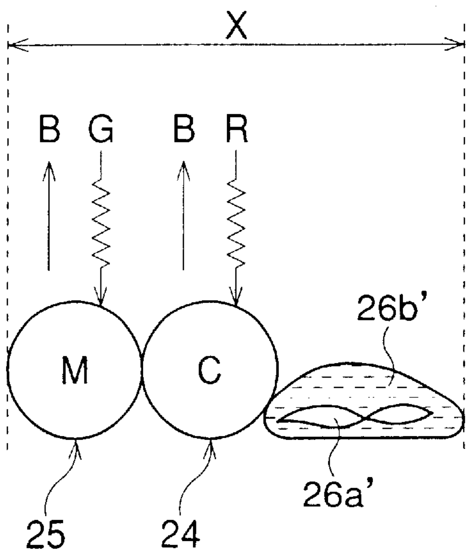
FIG. 5 is a schematic conceptual cross-sectioned view showing a micro-capsule selectively broken for developing a selected color.

The walls of the micro-capsules 24*a*, 25*a* and 26*a* are formed from a shape memory resin. For example, the shape memory resin is represented by a polyurethane-based-resin, such as polynorbornene, trans-1, 4-polyisoprene polyurethane. The walls 24*a*, 25*a* and 26*a* exhibit a characteristic relationship between temperature and elasticity coefficient as shown in FIG. 4. The shape memory resin exhibits a coefficient of elasticity, which abruptly changes at a glass-transition temperature boundary Tg. In the shape memory resin, Brownian movement of the molecular chains is stopped in a low-temperature area "a", which is less than the glass-transition temperature Tg, and thus the shape memory resin exhibits a glass-like phase. On the other hand, Brownian movement of the molecular chains becomes increasingly energetic in a high-temperature area "b", which is higher than the glass-transition temperature Tg, and thus the shape memory resin exhibits a rubber elasticity. Therefore, the walls 24*a*, 25*a* and 26*a* are fragile over the glass-transition temperature Tg.

The image forming system as shown FIG. 1 is provided with a paper supplier tray (not shown) for storing a plurality of recording sheets 20. On recording of the color image, one recording sheet 20 is retrieved from the tray. The recording sheet 20 is conveyed by a plurality of pairs of guide rollers 136 to a recording position as shown in FIG. 1. The recording sheet 20 is stopped at the recording position, being a nip of a pressure roller unit 138, which consists of a pressure roller 140 and a backup roller 142. When the scanning of the manuscript by the mirror 122 and the lamp 120 is started, and the optical image is locally focused on the recording sheet 20, the pressure roller unit 138 pulls the recording sheet 20 by rotation of the rollers 140 and 142. The recording sheet 20 is conveyed synchronously to the scanning of the image on the manuscript. The movement speed of the recording sheet 20 is determined according to an energy intensity of the radiated light from the halogen lamp 120 being focused through the optical system, a scanning speed and so forth. The speed is determined so that the selected micro-capsules (24, 25, 26) are heated, by being exposed to incident light radiation having wavelengths within the respective absorption bands of the selected micro-capsules (24, 25, 26), to a temperature higher than a common glass-transition temperature Tc corresponding to Tg of FIG. 4 that is set to a temperature selected from a range between 50° C. and 70° C. The total control of the image-forming system is performed by a control unit (not shown).

A surface treatment of the pressure roller 140 may be used that prevents adhesion of the white ink (24*b*, 25*b*, 26*b*) on the pressure roller 140. Or, the pressure roller may be made of a material that the white ink (24*b*, 25*b*, 26*b*) does not adhere to.

The color development by the micro-capsule walls 24*a*, 25*a* and 26*a* is now described in greater detail. When a blue pixel X is to be formed (FIG. 5), the yellow micro-capsule 26 which has a high absorption coefficient with respect to the color of blue, is selected to be broken. Since, upon breakage, the yellow micro-capsule 26 is hidden by the white ink 26*b*, blue light (arrow B) is predominantly reflected with green light (wavey-line G) being absorbed by the magenta micro-capsule 25 and red light (wavey-line R) being absorbed by the cyan micro-capsule 24 and thus a color blue is developed. Therefore, the pixel X is formed as "blue".

As mentioned above, the micro-capsules (24, 25, 26) which absorb, and are colored a complementary color of, the light of the color of a pixel to be developed are broken. The broken micro-capsules (24, 25, 26) are hidden by the discharged white ink (24*b*, 25*b*, 26*b*) and the required color light is not absorbed. Consequently, the desired colors are easily developed.

Figure 6:
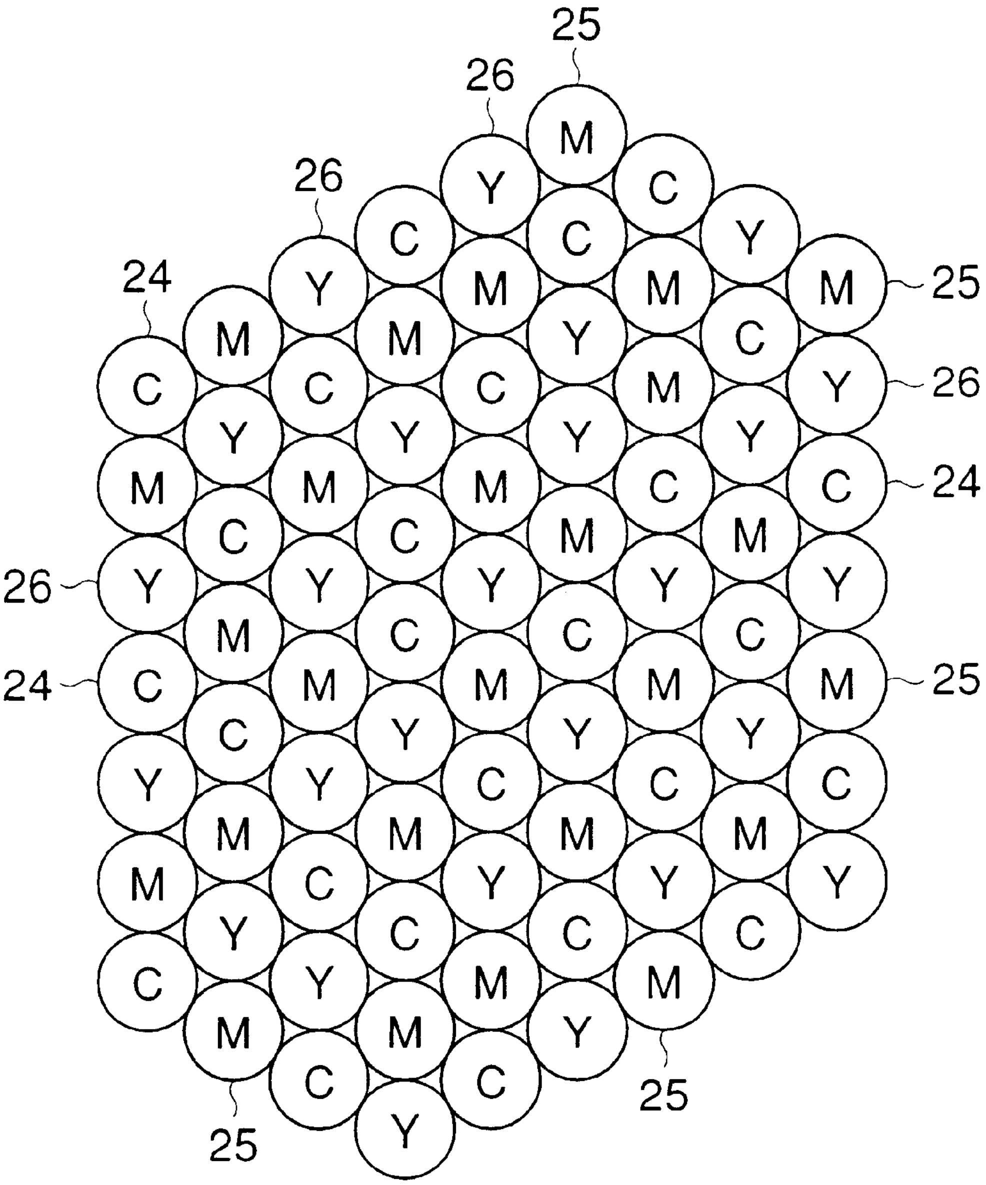
FIG. 6 is a conceptual plan view of a surface of a recording sheet of the first embodiment.
Figure 7:
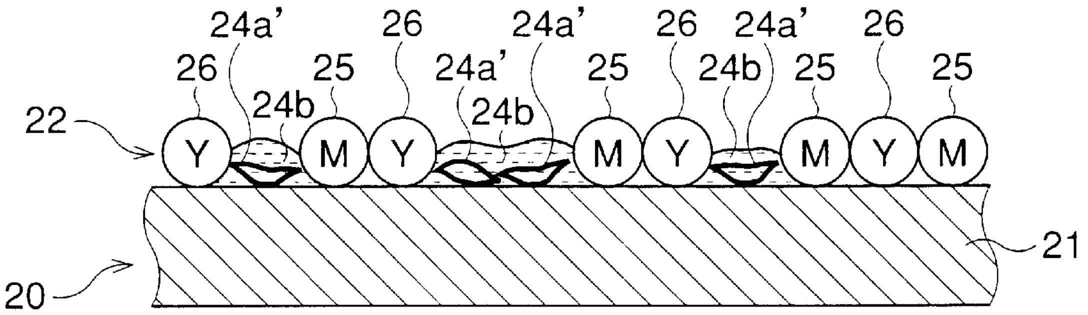
FIG. 7 is a cross-sectioned elevational view similar to FIG. 2, showing micro-capsules by which an optical image is recorded.
Figure 8:
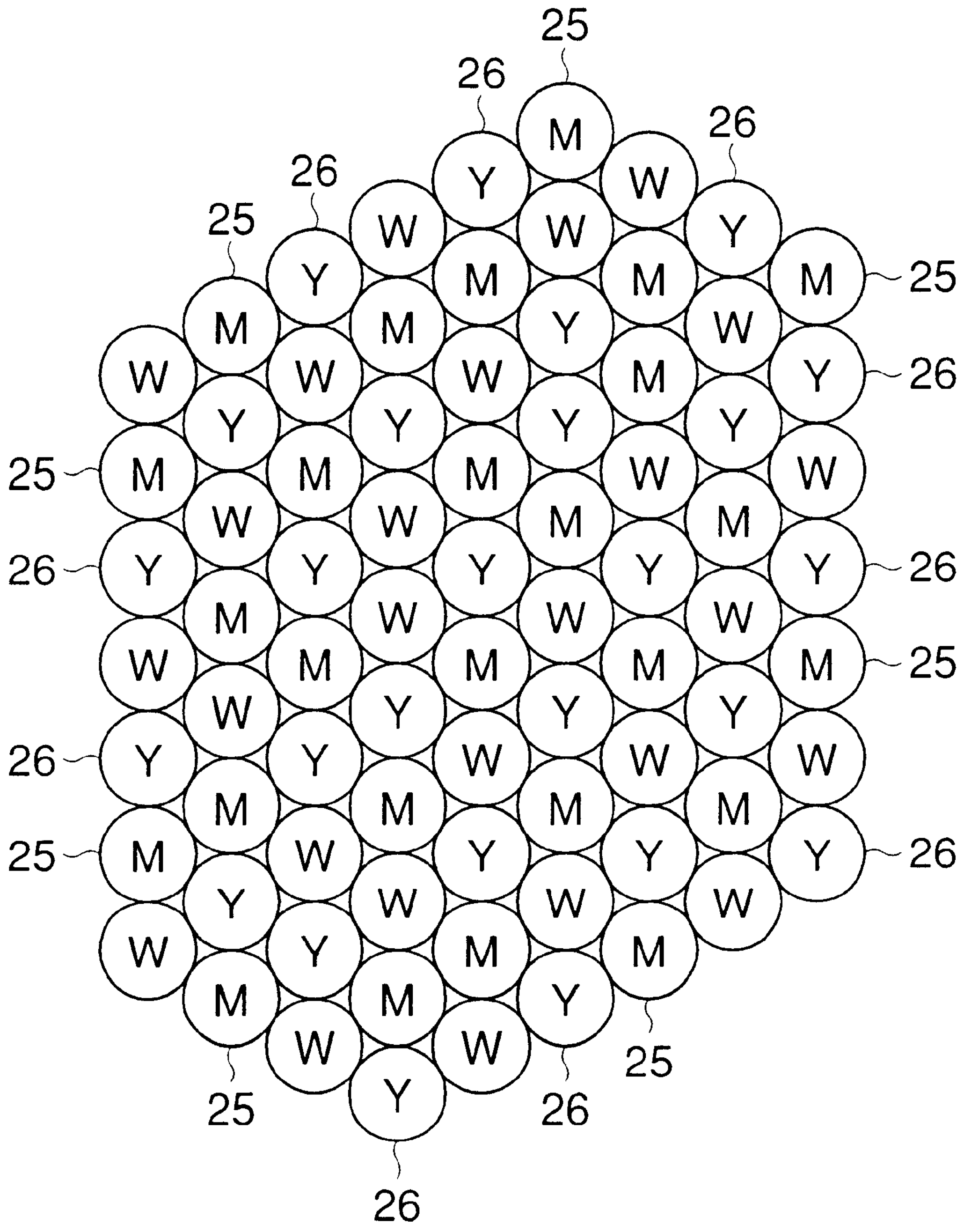
FIG. 8 is a conceptual plan view of a surface of a recording sheet similar to FIG. 6, showing micro-capsules by which an optical image is recorded.

FIG. 6 is a conceptual plan view of a surface of the recording sheet 20 of FIG. 2 before the image is formed, FIG. 7 is a cross-sectioned elevational view similar to FIG. 2, showing the micro-capsules (24, 25, 26) after an optical image is recorded, and FIG. 8 is a conceptual plan view of a surface of the recording sheet 20 similar to FIG. 6, showing the micro-capsules (24, 25, 26) after an image is recorded.

In FIG. 6, the micro-capsules 24, 25 and 26 are unbroken in a local area (micro-area) of the micro-capsule layer 22, and in FIG. 8, the cyan micro-capsules 24 are broken and whitened (shown by "W")by the white ink 24*b* discharged. In FIG. 7, the broken cyan micro-capsule walls (24*a*) are shown by a reference 24*a*', which is covered with the discharged white ink 24*b* so as to be blended-out by the white ink 24*b*.

In the first embodiment, the micro-capsules (24, 25, 26) are heated by light irradiating the micro-capsule layer 22 of the recording sheet 20. The color image to be formed is focused on the micro-capsule layer 22 for a predetermined time, thereafter or simultaneously, a common pressure Pc, that is determined by the thickness of the capsule walls 24*a*, 25*a* and 26*a*, is applied to the recording sheet 20 by pressure rollers 140, 142. The common pressure Pc is set to a pressure selected from a range between 15 MPa and 25 Mpa, in this embodiment. The light corresponding to pixels of the color image is selectively absorbed, due to a respective absorptivity, by the corresponding micro-capsules (24, 25, 26). The micro-capsules (24, 25, 26) that undergo high absorption of the incident light radiation, due to the wavelengths of the incident light radiation falling within the respective absorption bands of the micro-capsules (24, 25, 26), become heated to a greater degree. Then, the micro-capsules (24, 25, 26) heated to the grass-transition temperature Tc are broken by the applied common pressure Pc and the corresponding white inks (24*a*, 25*a*, 26*a*) are discharged.

When an image of a manuscript is irradiated by the halogen lamp 120, a light reflected on the manuscript is irradiated on the recording sheet 20. The reflected light includes the color components corresponding to the color pixels of the image on the manuscript. For example, a micro-area of the recording sheet 20 in FIG. 6 is irradiated with red light and, since the cyan micro-capsules 24 have an absorption band that allows a high absorptivity of the wavelength of incident radiation corresponding to red light, only the cyan micro-capsules 24 are broken, and thus in the corresponding micro-area of FIG. 8, a red image is generated. Therefore, the image is formed on the recording sheet by a one time scanning of the image on the manuscript.

Figure 9:
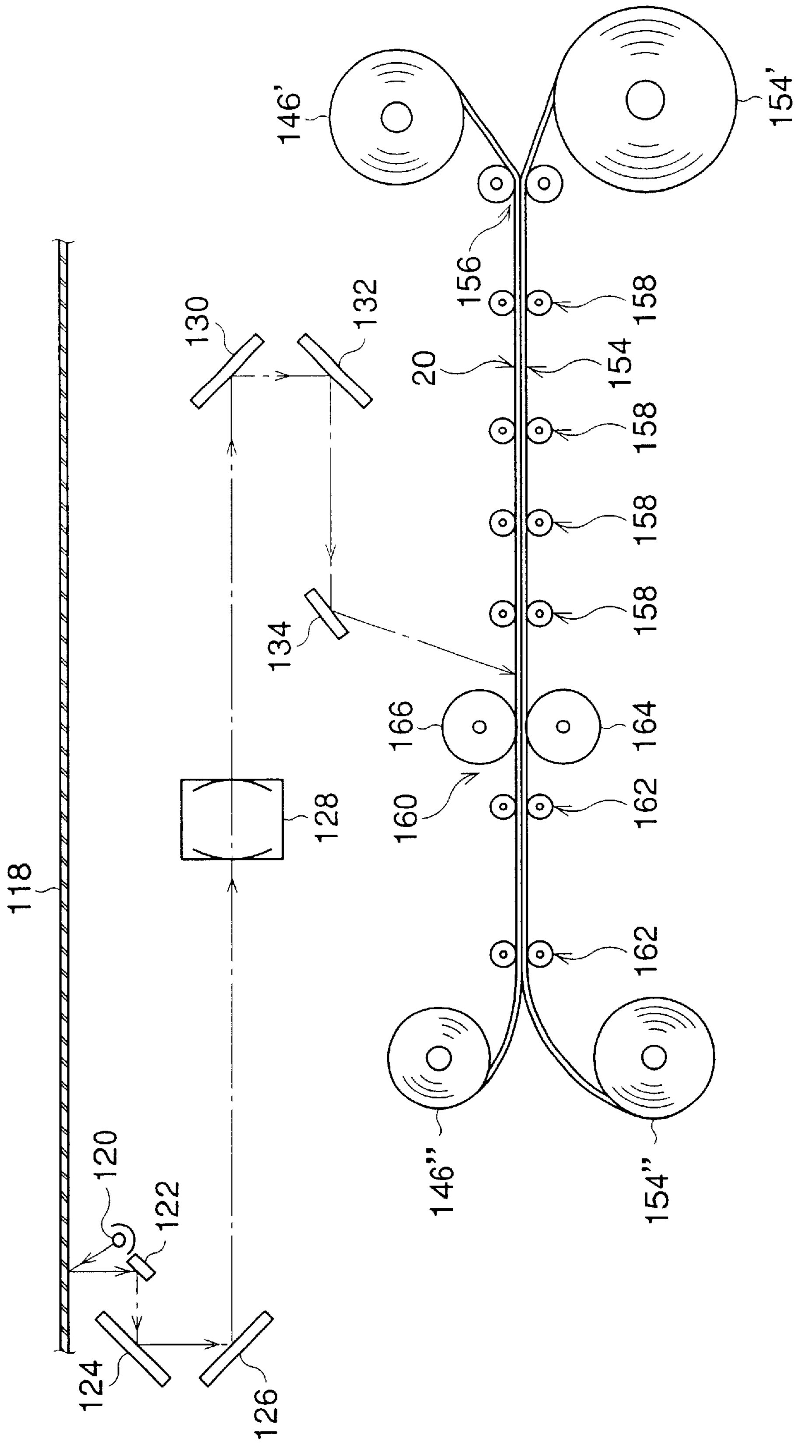
FIG. 9 is a schematic cross-sectioned elevational view of a second embodiment of an image forming system according to the present invention.

FIG. 9 is a schematic cross-sectioned elevational view of a second embodiment of an image forming system incorporating a second embodiment of the recording sheet 20 shown in FIGS. 10 to 14. Differently from the first embodiment of the image forming system, the recording sheet 20 is formed as a roll and conveyed from a roll 146' to a roll 146". The recording sheet 20 is pulled from the roll 146' by a pulling roller 156 operated by a motor (not shown) and directed by a plurality of pairs of guide rollers 158. The transfer sheet 154 is also formed as a roll and is conveyed from a roll 154' to a roll 154" synchronously with and tightly contacting the recording sheet 20. The recording sheet 20 and the transfer sheet 154 are pressed by a pressure unit 160 having a pressure roller 166 and a backup roller 164 so that the broken walls (24*a*, 25*a*, 26*a*) and discharged ink (24*b*, 25*b*, 26*b*) are removed from the recording sheet 20 and transferred to the transfer sheet 154.

The total control of the image-forming system is performed by a control unit (not shown).

Figure 10:
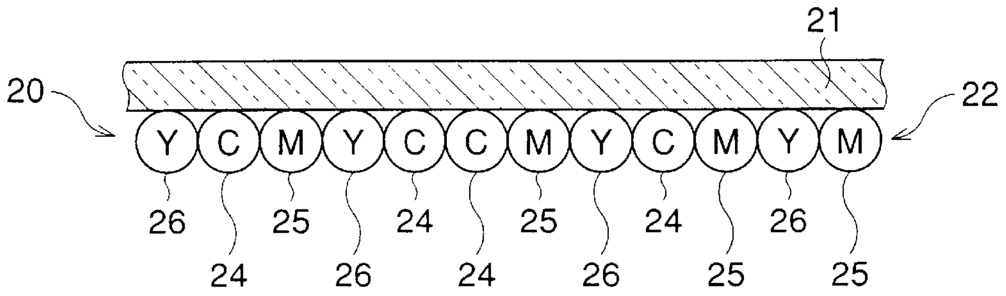
FIG. 10 is a cross-sectioned elevational view showing a structure of a second embodiment of a recording sheet for the second embodiment of an image forming system.
Figure 11:
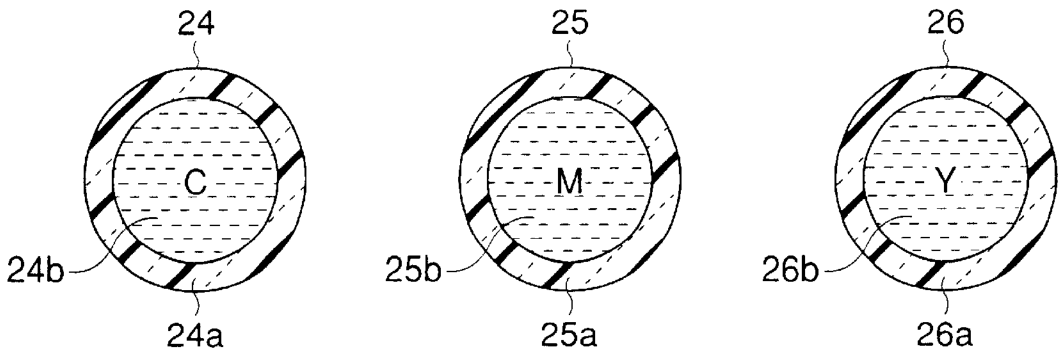
FIG. 11 is a cross-sectioned elevational view showing different types of micro-capsules utilized in the second embodiment of the recording sheet.

FIG. 10 is a cross-sectioned elevational view showing a structure of the second embodiment of the recording sheet 20

The recording sheet 20 includes the base member 21 made of a transparent film, which is coated with the micro-capsule layer 22 formed from a suitable binder (adhesive). The micro-capsule layer 22 includes the three types of micro-capsules 24, 25 and 26, being, the cyan type of micro-capsule 24, the magenta type of micro-capsule 25 and the yellow type of micro-capsule 26, respectively. From FIG. 11, the micro-capsules 24, 25 and 26 have capsule walls 24*a*, 25*a* and 26*a*, respectively, filled with core materials 24*b*, 25*b* and 26*b*, respectively. As shown FIG. 11, the walls 24*a*, 25*a* and 26*a* are made of a transparent shape memory resin with common glass-transition temperature (Tc) and breaking pressure (Pc) characteristics, and the core materials 24*b*, 25*b* and 26*b* are cyan, magenta and yellow inks, respectively.

Figure 12:
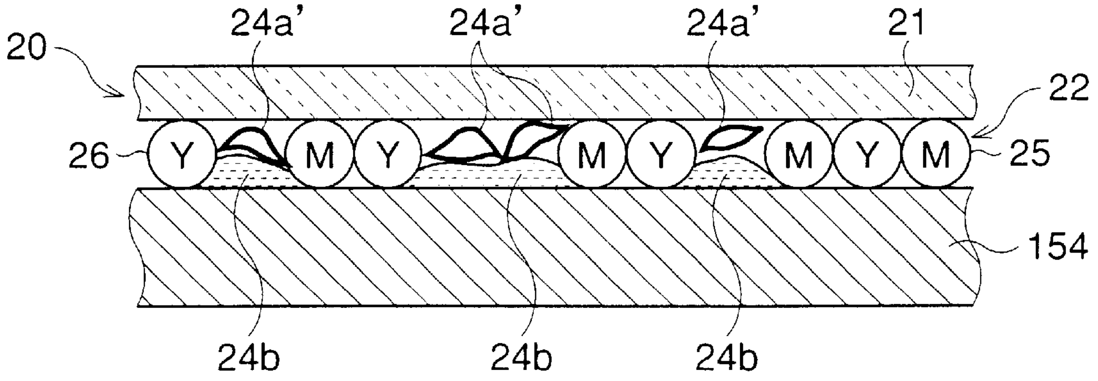
FIG. 12 is a cross-sectioned elevational view of the micro-capsule layer in which the image is recorded.
Figure 13:
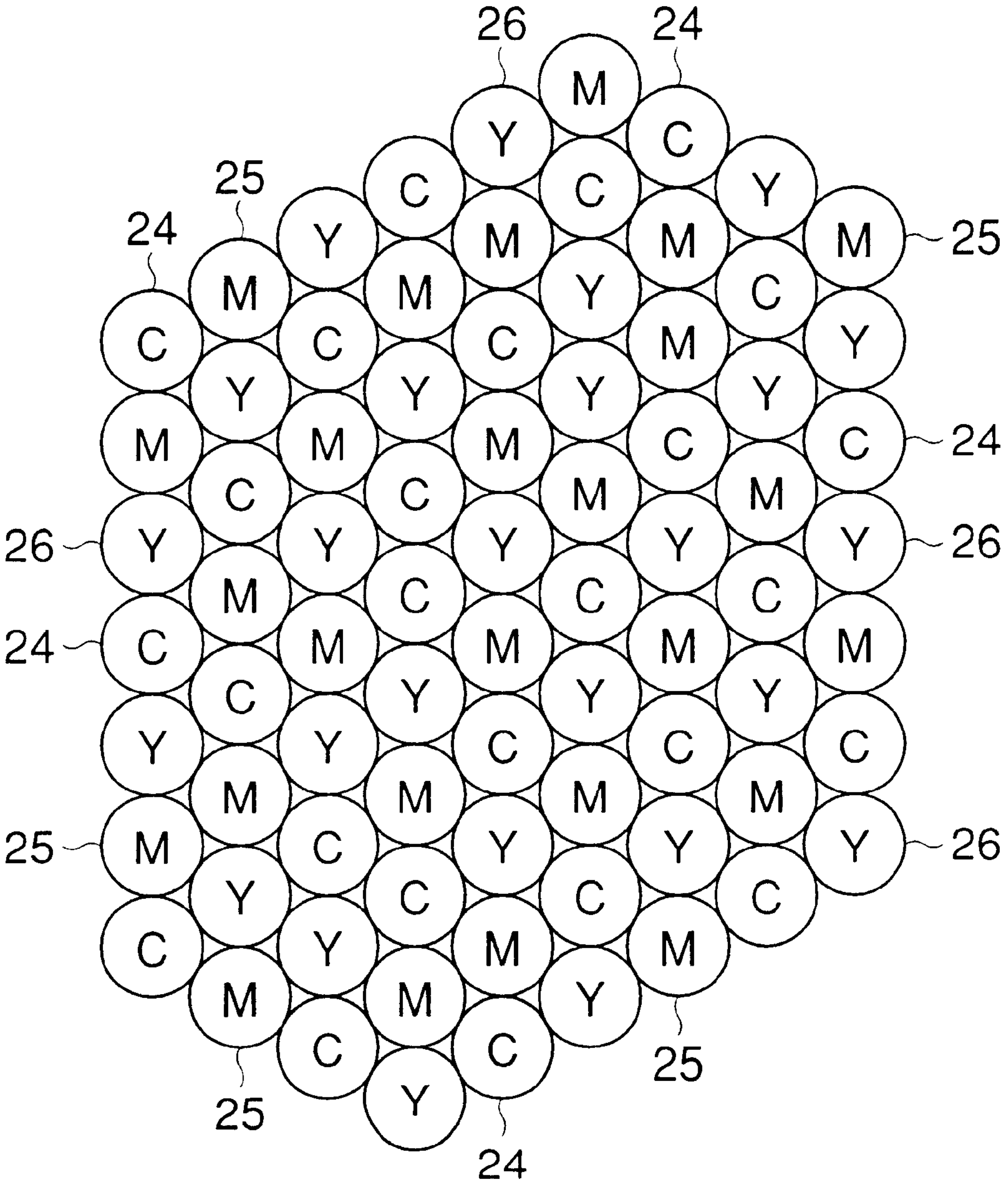
FIG. 13 is a cross-sectioned elevational view of a recording sheet similar to FIG. 6, on which the image is recorded.

FIG. 12 shows a cross-sectioned elevational view of the micro-capsule layer in which the image is recorded. FIG. 13 shows the surface of the recording sheet 20 in which the micro-capsules (24, 25, 26) are unbroken, and FIG. 14 shows the surface of the recording sheet 20 on which an image is recorded.

Figure 14:
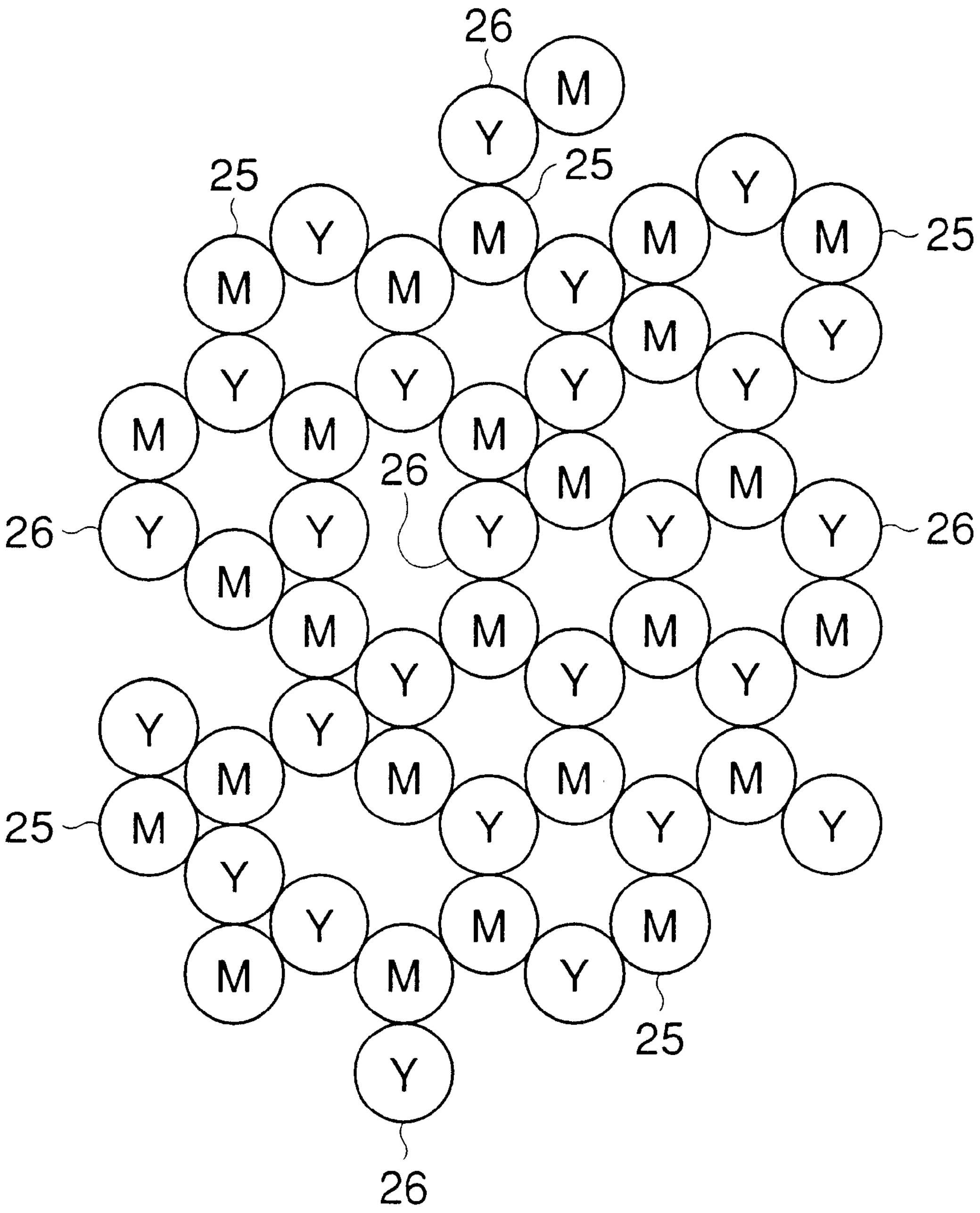
FIG. 14 is a conceptual plan view of a surface of a recording sheet similar to FIG. 8, showing micro-capsules by which an optical image is recorded.

In FIG. 13, the micro-capsules 24, 25 and 26 are unbroken in a local area (micro-area) of the micro-capsule layer 22, and in FIG. 14, the cyan micro-capsules 24 are broken and the discharged cyan ink 24*b* has been removed, i.e. blended-out, as shown by blanks. In FIG. 12, the broken cyan micro-capsule walls (24*a*) are shown by a reference 24*a*', and are supported by a transfer sheet 154 contacting the micro-capsule layer 22 of the recording sheet 20. The broken walls 24*a* ' and discharged ink 24*b* are supported by and adhered to the transfer sheet 154. When the transfer sheet 154 is separated from the recording sheet 20, the walls 24*a*' and ink 24*b* are removed from the recording sheet, as shown in FIG. 14. When the cyan broken micro-capsules 24 are removed, "red" is developed, when broken magenta micro-capsules 25 are removed, "blue" is developed, and when broken yellow micro-capsules 24 are removed, "green" is developed. Further combinations can also be selected to generate other colors.

Similarly to the first embodiment, the image is formed on the recording sheet 20 by a one time scanning of the image on the manuscript, and as such the second embodiment functions in a manner similar to that of the first embodiment.

In this embodiment, a negative image is also available, that is automatically formed on the transfer sheet 154 due to transfer of the discharged ink (24*b*, 25*b*, 26*b*).

As an alternative to using the transfer sheet 154, the discharged ink (24*b*, 25*b*, 26*b*) may be removed by a suitably applied solvent.

Figure 15:
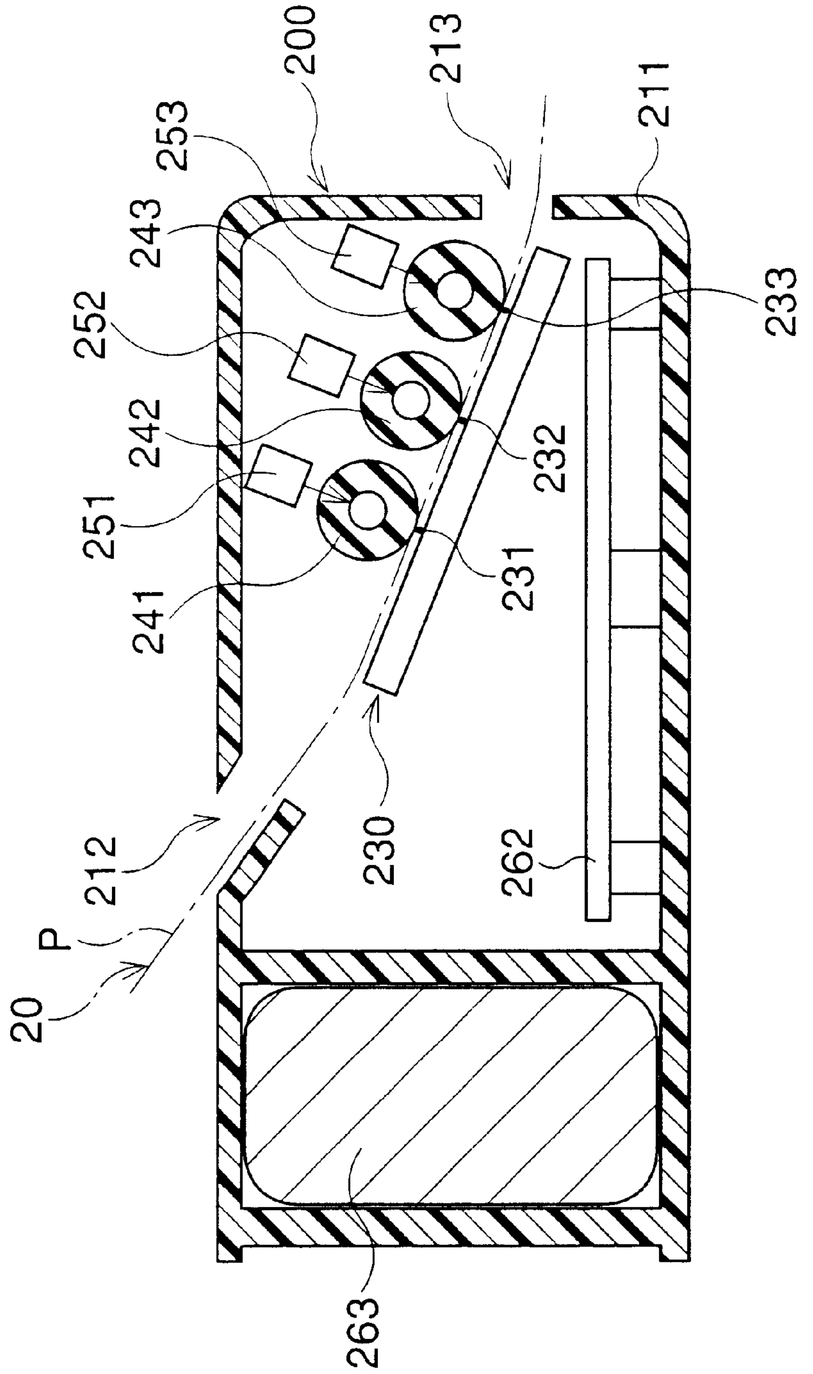
FIG. 15 is a cross-sectioned elevational view showing a high-resolution color printer of a third embodiment of an image-forming system.

FIG. 15 is a cross-sectioned elevational view of a high-resolution color printer 200 for pressure-sensitive and heat-sensitive recording of a full-color image on a recording sheet 20. The color printer 200 comprises a selective breaking unit including a thermal head 230, platen rollers 241, 242 and 243, and spring units 251, 252 and 253. The recording sheet 20 comprises a micro-capsule layer including three types of micro-capsules corresponding to colors of cyan, magenta and yellow.

The color printer 200 is a line printer extending perpendicular to a longitudinal direction of the recording sheet 20 ("line direction", hereinafter), which prints a color image line by line. The printer 200 comprises a housing 211, which is rectangular parallelepiped in the line direction. An inlet slit 212 is provided on an upper surface of the housing 211 for inserting the recording sheet 20, and an outlet slit 213 is provided on a side surface of the housing 211. The recording sheet 20 passes along a conveyer path P, shown by a single-chained line coinciding with the recording sheet 20, from the insert slit 212 to the outlet slit 213.

The thermal head 230 is disposed under the conveyer path P within the housing 211. A plurality of heating elements 231 are aligned on a upper surface of the thermal head 230 along the line direction. Similarly, a plurality of heating elements 232, and a plurality of heating elements 233 are aligned on the upper surface of the thermal head 230 along the line direction. The heating elements 231, 232 and 233 output Joule heat.

The platen rollers 241, 242 and 243 are made of rubber and are rotatably supported over the conveyer path P. The platen rollers 241, 242 and 243 are positioned to correspond to the heating elements 231, 232 and 233, respectively. The combination of the heating elements 231 and the platen roller 241, the combination of the heating elements 232 and the platen roller 242, and the heating elements 233 and the platen roller 243 are provided in accordance to a number of primary colors of the subtractive mixture, being cyan, magenta and yellow in this embodiment, to be developed on the recording sheet 20. The cyan, magenta and yellow colors are developed by blending-out or hiding colors of shell walls of the micro-capsules, as mentioned below. Therefore, a number of combinations corresponds to the number of colors to be developed. The platen rollers 241, 242 and 243 exert different pressures p1, p2 and p3, respectively, via the spring units 251, 252 and 253. The recording sheet 20 is uniformly pressed along linear areas in the line direction by the platen rollers 241, 242 and 243, being resiliently biased toward the heating elements 231, 232 and 233. The heating elements 231, 232 and 233 are electrically energized by a driving circuit on a circuit board 262 (FIG. 15), which heats the heating elements 231, 232 and 233 to different heating temperatures t1, t2 and t3, respectively. The platen rollers 241, 242 and 243 are driven at a constant speed by a motor (not shown), which is controlled by the control unit on the circuit board 262. A battery 263 for supplying electric power to the components of the color printer 200, such as the motor and control circuits, is disposed in a compartment of the housing 211 at a side opposite to the surface with the outlet slit 213.

The recording sheet 20 is introduced to the inlet slit 212, and is conveyed at the constant speed by the rotating platen rollers 241, 242 and 243 along the conveyer path P. The recording sheet 20 is selectively and locally heated and pressured when interposed between the heating elements 231, 232 and 233, and the platen roller 241, 242 and 243. Thus, a color image is formed as the recording sheet 20 is transported downstream toward the outlet slit 213, where ejection occurs.

Figure 16:
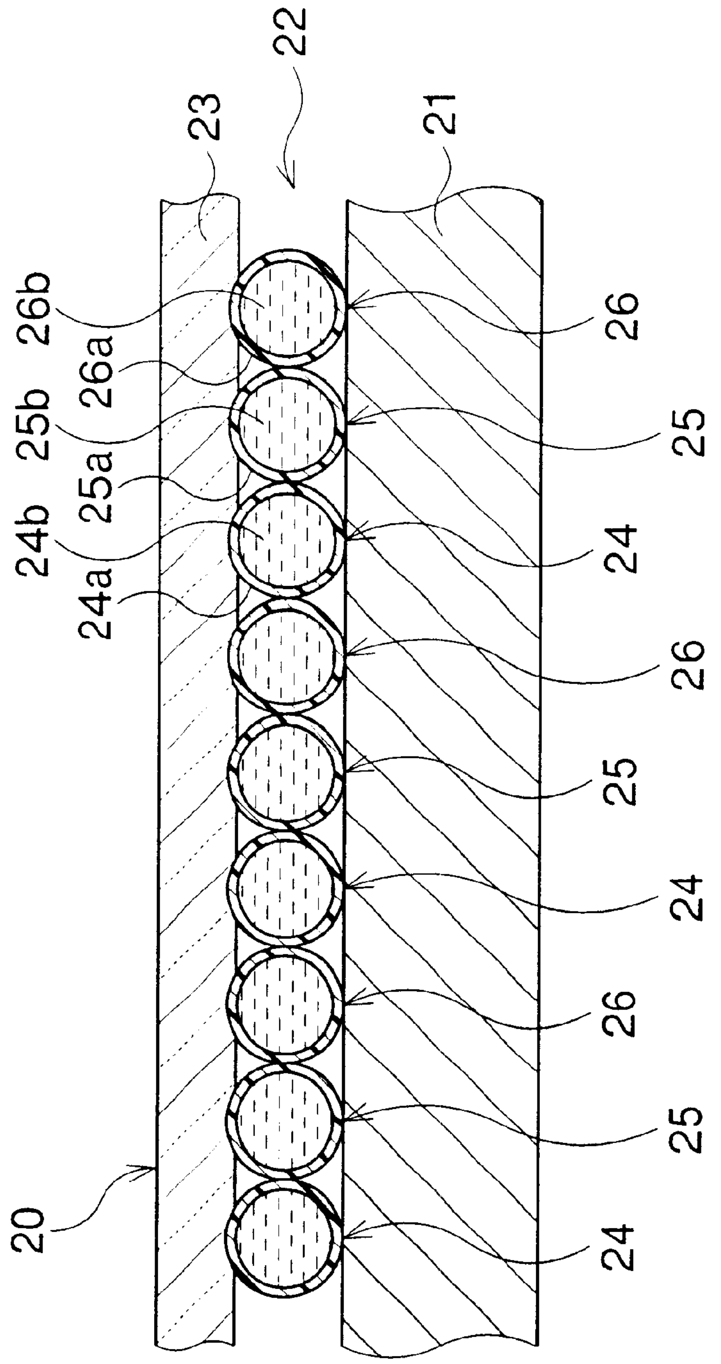
FIG. 16 is a cross-sectioned elevational view showing a structure of a third embodiment of a recording sheet for the color printer.

FIG. 16 is a cross-sectioned elevational view showing a structure of a third embodiment of the recording sheet 20 for the color printer 200.

The recording sheet 20 includes a base member 21 made of white paper which is coated with a micro-capsule layer 22 formed of a suitable binder (adhesive). The micro-capsule layer 22 includes three types of micro-capsules 24, 25 and 26, being, in this case, a cyan type of micro-capsule, a magenta type of micro-capsule and a yellow type of micro-capsule, respectively. The micro-capsules 24, 25 and 26 have capsule walls 24*a*, 25*a* and 26*a*, respectively, filled with core materials 24*b*, 25*b* and 26*b*, respectively. In the third embodiment, the walls 24*a*, 25*a* and 26*a* are colored cyan, magenta and yellow, respectively, and the core materials 24*b*, 25*b* and 26*b* are white ink that is suitable for hiding or blending-out the color of the walls 24*a*, 25*a* and 26*a* once broken. Furthermore, the micro-capsule layer 22 is covered with a transparent protective film 23 for protecting the micro-capsules 24, 25 and 26 against discoloration and fading due to damaging electromagnetic radiation or oxidation.

In FIG. 16, for the convenience of illustration, although the micro-capsule layer 22 is shown as having a thickness corresponding to a diameter of the micro-capsules 24, 25 and 26, in reality, the three types of micro-capsules 24, 25 and 26 may overlay each other due to a manufacturing process, and thus the capsule layer 22 may have a larger thickness than the diameter of a single micro-capsule 24, 25 or 26. The micro-capsules 24, 25 and 26 are homogeneously mixed to create a randomized binder solution, which is then coated uniformly over the base member by an atomizer.

Figure 17:
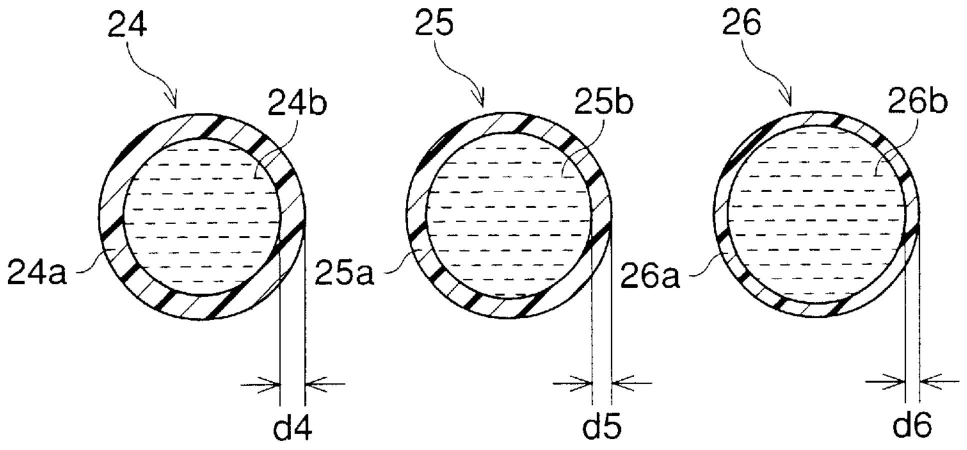
FIG. 17 is a cross-sectional view showing different types of micro-capsule utilized in the third embodiment.

FIG. 17 is a cross-sectional view showing different types of micro-capsule 24, 25 and 26 used in the third embodiment.

As shown in FIG. 17, the micro-capsule walls 24*a*, 25*a* and 26*a* of the cyan micro-capsules 24, magenta micro-capsules 25, and yellow micro-capsules 26, respectively, have differing thicknesses. The thickness d4 of the cyan micro-capsules 24 is larger than the thickness d5 of the magenta micro-capsules 25, and the thickness d5 of the magenta micro-capsules 25 is larger than the thickness d6 of the yellow micro-capsules 26. The greater the thickness of the wall (24*a*, 25*a*, 26*a*), the higher the breaking pressure (p1, p2, p3). Therefore, the micro-capsule 25 is broken and compacted under the breaking pressure p2 lower than the breaking pressure p1 for breaking the micro-capsule 24, and the micro-capsule 26 is broken and compacted under the breaking pressure p3 lower than the breaking pressure p2 for breaking the micro-capsule 25.

The walls of the micro-capsules 24*a*, 25*a* and 26*a* are formed from a shape memory resin, similar to that of the first embodiment. For example, the shape memory resin is represented by a polyurethane-based-resin, such as polynorbornene, trans-1, 4-polyisoprene polyurethane. The walls 24*a*, 25*a* and 26*a* exhibit a characteristic relationship between temperature and elasticity coefficient as previously shown in FIG. 4.

By suitably selecting the glass-transition temperatures and the breaking pressures (p1, p2, p3), the micro-capsules (24, 25, 26) to be broken are accurately selected.

The selection and breaking of the micro-capsules 24, 25 and 26 is described with reference to FIGS. 18 and 19.

Figure 18:
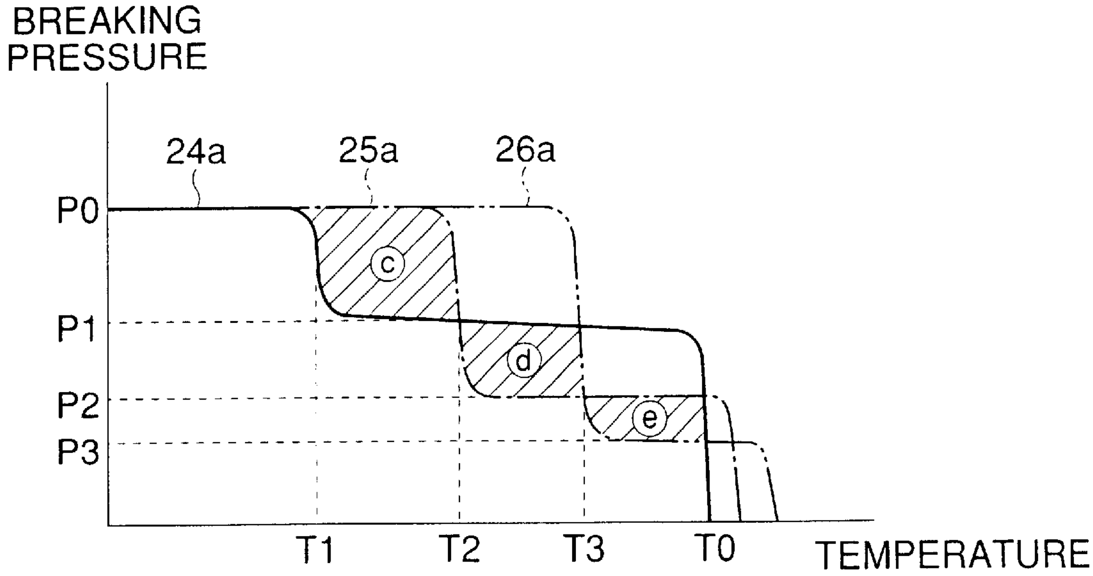
FIG. 18 is a diagram showing a characteristic relationship between temperature and breaking pressure of a capsule wall of the different types of micro-capsules.
Figure 19:
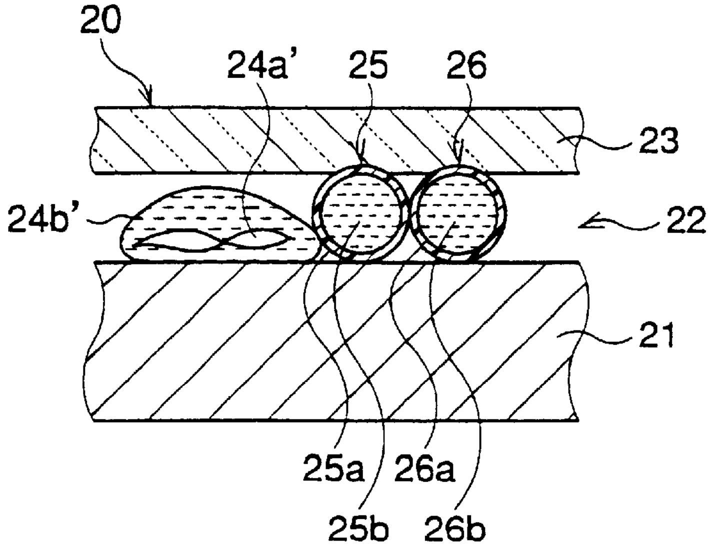
FIG. 19 is a cross-sectioned elevational view similar to FIG. 16, showing a selective breakage of a micro-capsule.

FIG. 18 is a diagram showing a characteristic relationship between temperature and breaking pressure (p1, p2, p3) of capsule walls 24*a*, 25*a* and 26*a*. FIG. 19 shows the selective breakage of the micro-capsule wall 24*a*.

The wall thickness d4 of the cyan micro-capsules 24 is selected such that each cyan micro-capsule 24 is broken and compacted under breaking pressure p1 that lies between a critical breaking pressure P1 and an upper limit pressure P0 (FIG. 18), when each cyan micro-capsule 24 is heated to temperature t1, by heating elements 31 (FIG. 15), lying between the glass-transition temperatures T1 and T2; the wall thickness d5 of the magenta micro-capsules 25 is selected such that each magenta micro-capsule 25 is broken and compacted under breaking pressure p2 that lies between a critical breaking pressure P2 and the critical breaking pressure P1 (FIG. 18), when each magenta micro-capsule 25 is heated to temperature t2, by heating elements 32, lying between the glass-transition temperatures T2 and T3; and the wall thickness d6 of the yellow micro-capsules 26 is selected such that each yellow micro-capsule 26 is broken and compacted under breaking pressure p3 that lies between a critical breaking pressure P3 and the critical breaking pressure P2 (FIG. 18), when each yellow micro-capsule 26 is heated to a temperature t3, by heating elements 33, lying between the glass-transition temperature T3 and an upper limit temperature T0.

The glass-transition temperature T1 may be set to a temperature selected from a range between 65° C. and 70° C. and the temperatures T2 and T3 are set so as to increase in turn by 40° C. from the temperature set for T1. In this embodiment, the glass-transition temperature T1, T2 and T3 are 65° C., 105° C. and 145° C., respectively. The upper limit temperature T0 may be set to a temperature selected from a range between 185° C. and 190° C. Also, for example, the breaking pressures Py, Pm, Pc and P0 are set to 0.02, 0.2, 2.0 and 20 MPa, respectively.

For example, the heating temperature t1 and breaking pressure p1 fall within a hatched cyan area c (FIG. 18), defined by a temperature range between the glass-transition temperatures T1 and T2 and by a pressure range between the critical breaking pressure P1 and the upper limit pressure P0, thus only the cyan type of micro-capsule 24 is broken and squashed, thereby seeping the white ink 24*b*. Consequently, the cyan color of the cyan micro-capsule wall 24*a* is blended-out, i.e. hidden, by the white ink 24*b* on the recording sheet 20.

Also, the heating temperature t2 and breaking pressure p2 fall within a hatched magenta area d, defined by a temperature range between the glass-transition temperatures T2 and T3 and by a pressure range between the critical breaking pressures P2 and P1, thus only the magenta type of micro-capsule is broken and squashed, thereby seeping the white ink 25*b*. Consequently, the magenta color of the magenta micro-capsule wall 25*b* is blended-out, i.e. hidden, by the white ink 25*b* on the recording sheet 20. Further, the heating temperature t3 and breaking pressure p3 fall within a hatched yellow area e, defined by a temperature range between the glass-transition temperature T3 and the upper limit temperature T0 and by a pressure range between the critical breaking pressures P2 and P3, thus only the yellow type of micro-capsule 26 is broken and squashed, thereby seeping the white ink 26*b*. Consequently, the yellow color of the yellow micro-capsule wall 26*a* is blended-out, i.e. hidden, by the white ink 26*b* on the recording sheet 20.

In the third embodiment of the image forming system, the micro-capsules 24, 25 and 26 are readily and selectively broken and the white inks 24*b*, 25*b* and 26*b* are discharged having the same color as the color of the base member 21. The micro-capsules (24, 25, 26) of the colors to be developed are hidden, thus the color image is easily formed. The present embodiment is advantageous in that images in which most of the micro-capsules remain unbroken are generated, and thus efficient energy use is realized.

The core material (24*b*, 25*b* and 26*b*) is white ink in the above embodiment, however, any other color ink can be used which enable the colors of the micro-capsule walls 24*a*, 25*a* and 26*a* to be hidden.

Figure 20:
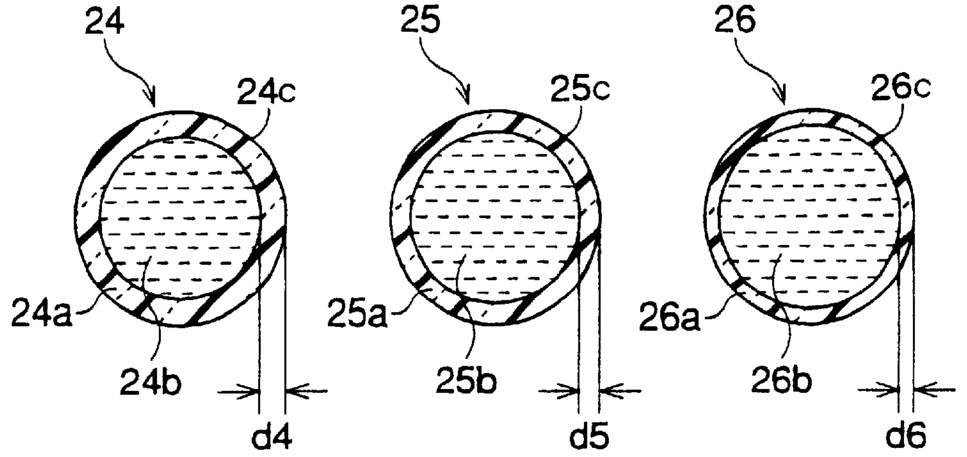
FIG. 20 is a cross-sectional view showing different types of micro-capsules utilized in a fourth embodiment of a recording sheet.

FIG. 20 shows different types of micro-capsules utilized in a fourth embodiment of a recording sheet.

Differently from the third embodiment, the micro-capsules 24, 25 and 26 include transparent walls 24*a*, 25*a* and 26*a*, respectively, that are filled with core materials 24*b*, 25*b* and 26*b*, respectively. The walls 24*a*, 25*a* and 26*a* are made of shape memory resin, and outer surfaces of the walls 24*a*, 25*a* and 26*a* are coated with a cyan coating 24*c*, a magenta coating 25*c* and a yellow coating 26*c*, respectively, being an oxidized (developed) leuco-based coloring materials, for example. The core materials 24*b*, 25*b* and 26*b* are aliphatic-amine, amide, piperidine or other compounds reacting chemically with the leuco-based coating materials (24*c*, 25*c*, 26*c*)so as to render the broken walls (24*a*, 25*a*, 26*a*) transparent. Thus, the broken walls (24*a*, 25*a*, 26*a*) do not absorb incident light, allowing a desired color to be exhibited.

In the fourth embodiment of the recording sheet 20, the micro-capsule walls 24*a*, 25*a* and 26*a*, with coatings cyan 24*c*, magenta 25*c* and yellow 26*c*, respectively, are selectively and locally broken and the compounds 24*b*, 25*b* and 26*b*, enclosed in the walls 24*a*, 25*a*, 26*a*, are discharged so as to render the walls 24*a*, 25*a*, 26*a* transparent. The micro-capsules (24, 25, 26) which absorb the light of the color of a pixel to be developed are broken, and the colors (24*c*, 25*c*, 26*c*) of the broken walls (24*a*, 25*a*, 26*a*) are rendered transparent i.e. blended-out. Thus, the color image is formed.

By adjusting the pressure (p1, p2, p3) and temperature (t1, t2, t3), similarly to the third embodiment, the micro-capsules 24,25 and 26 are readily and selectively broken. The chemical compounds for making the walls transparent are discharged, and the image is formed on the recording sheet 20. The present embodiment is also advantageous in that images in which most of the micro-capsules (24, 25, 26) remain unbroken are generated, and thus efficient energy use is realized.

The core material 24*b*, 25*b* and 26*b* makes the respective micro-capsule walls 24*a*, 25*a* and 26*a* transparent, however, any other suitable material may be used that thins or blends-out the colors (24*c*, 25*c*, 26*c*)of the walls 24*a*, 25*a* and 26*a*.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Applications No. 10-080429 (filed on Mar. 12, 1998) and No. 10-088025 (filed on Mar. 17, 1998) which are expressly incorporated herein, by reference, in their entireties.

What is claimed is:

1. An image-forming system that records an image, the system comprising:

a recording sheet that includes a base member and a micro-capsule layer of a plurality of types of micro-capsules on said base member, each of said types of micro-capsules being broken when subjected to the substantial simultaneous application of a predetermined pressure and a predetermined temperature, said each type of micro-capsules, when broken, producing a color that is complementary to the color of said each type of micro-capsule, said each type of micro-capsules being filled with a core material which is discharged when said each type of micro-capsules is broken, said color being blended-out when said core material is discharged; and a selective breaking unit that selectively breaks said micro-capsules.

2. The image-forming system of claim 1, wherein a micro-capsule wall of said each type of micro-capsule has a color different from a micro-capsule wall of said other types of micro-capsules, and said core material has a color similar to a color of said base member such that said color of said micro-capsule wall is blended-out when said core material is discharged.

3. The image-forming system of claim 1, wherein a micro-capsule wall of said each type of micro-capsule is colored by a colored material different from a micro-capsule wall of said other types of micro-capsule, and said discharged core material renders said broken micro-capsule wall transparent by chemically reacting with said colored material so as to blend-out said color.

4. The image-forming system of claim 1, wherein a micro-capsule wall of said each type of micro-capsule is transparent, said core material of said each type of micro-capsule having a color different from said other types of micro-capsules, and a removing unit being provided to remove said discharged core material and said squashed micro-capsule wall so as to blend-out said color.

5. The image-forming system of claim 1, wherein said predetermined pressure and temperature of one type of said micro-capsules is different from said predetermined pressure and temperature of said other types of micro-capsules, and said selective breaking unit comprises a heating unit that selectively heats said micro-capsules to said predetermined temperatures, and a pressure application unit that selectively applies said predetermined pressures to said micro-capsules.

6. The image-forming system of claim 5, wherein said heating unit comprises a plurality of thermal heads corresponding to said plurality of types of micro-capsules, each of said thermal heads selectively heating a corresponding one of said types of micro-capsules to said predetermined temperature.

7. The image-forming system of claim 5, wherein a micro-capsule wall of said each type of micro-capsule has a color different from a micro-capsule wall of said other types of micro-capsules, and said core material has a color similar to a color of said base member such that said color of said micro-capsule wall is blended-out when said core material is discharged.

8. The image-forming system of claim 5, wherein a micro-capsule wall of said each type of micro-capsule is colored by a colored material different from a micro-capsule wall of said other types of micro-capsule, and said discharged core material renders said squashed micro-capsule wall colorless by chemically reacting with said colored material so as to blend-out said color.

9. The image-forming system of claim 1, wherein said selective breaking unit is a heating unit which radiates light of a plurality of wavelengths corresponding to said types of micro-capsules, and said each type of micro-capsule has a corresponding high absorptivity with respect to a specific band of wavelengths of light, so that said each type of micro-capsules is selectively heated by said radiated light.

10. The image-forming system of claim 9, wherein a micro-capsule wall of said each type of micro-capsules has a color different from a micro-capsule wall of said other types of micro-capsules, and said core material has a color similar to a color of said base member such that said color of said micro-capsule wall is blended-out when said core material is discharged.

11. The image-forming system of claim 9, wherein a micro-capsule wall of said each type of micro-capsule is transparent, said core material of said each type of micro-capsule having a color different from said other types of micro-capsules, and a removing unit being provided to remove said discharged core material and said squashed micro-capsule wall so as to blend-out said color.

12. The image-forming system of claim 11, wherein said removing unit comprises a transfer sheet contacting said recording sheet, and a pressure unit that presses said recording sheet against said transfer sheet so that said discharged core material is transferred to said transfer sheet.

13. The image-forming system of claim 11, wherein said removing unit comprises a solvent that dissolves said discharged core material discharged such that said discharged core material is removed.

14. The image-forming system of claim 9, wherein said each micro-capsule exhibits a complementary color corresponding to said specific band of wavelength of light such that said each micro-capsules has a high absorptivity with respect to said wavelength of light.

15. The image-forming system of claim 1, wherein said color of each type of micro-capsules is one of cyan, magenta and yellow.

16. A recording sheet of an image-forming system comprising:

a base member; and a micro-capsule layer of a plurality of types of micro-capsules on said base member, each of said types of micro-capsule being broken under a predetermined pressure and temperature, said predetermined pressure and temperature of one type of micro-capsule being different from said predetermined pressure and temperature of other types of micro-capsule, said each type of micro-capsule having a color different from said other types of micro-capsule, said each type of micro-capsule being filled with a core material which is discharged when said micro-capsule is broken, such that said color is blended-out;

wherein a micro-capsule wall of said each type of micro-capsule has a color different from a micro-capsule wall of said other types of micro-capsules, said core material has a color similar to a color of said base member such that said color of said micro-capsule wall is blended-out when said core material is discharged.

17. A recording sheet of an image-forming system comprising:

a base member; and a micro-capsule layer of a plurality of types of micro-capsules on said base member, said total micro-capsules being broken under a predetermined pressure and temperature, said each type of micro-capsule have a color different from said other types of micro-capsule, said each type of micro-capsule being filled with a core material which is discharged when said micro-capsule is broken, such that said color is blended-out;

wherein a micro-capsule wall of said each type of micro-capsule has a color different from a micro-capsule wall of said other types of micro-capsules, and said core material has a color similar to a color of said base member such that said color of said micro-capsule wall is blended-out when said core material is discharged.

18. A recording sheet of an image-forming system comprising:

a base member; and a micro-capsule layer of a plurality of types of micro-capsules on said base member, each of said types of micro-capsule being broken under a predetermined pressure and temperature, said predetermined pressure and temperature of one type of micro-capsule being different from said predetermined pressure and temperature of other types of micro-capsule, said each type of micro-capsule having a color different from said other types of micro-capsule, said each type of micro-capsule being filled with a core material which is discharged when said micro-capsule is broken, such that said color is blended-out;

wherein a micro-capsule wall of said each type of micro-capsule is colored by a colored material different from a micro-capsule wall of said other types of micro-capsules, and said discharged core material renders said broken micro-capsule colorless by chemically reacting with said colored material so as to blend out said color.

* * * * *